(12) United States Patent
Fukushima et al.

(10) Patent No.: US 9,463,702 B2
(45) Date of Patent: Oct. 11, 2016

(54) CHARGING INLET DEVICE

(71) Applicant: YAZAKI CORPORATION, Tokyo (JP)

(72) Inventors: Hirotaka Fukushima, Shizuoka (JP);
Daisuke Sugiyama, Shizuoka (JP);
Tsutomu Sawada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/433,118

(22) PCT Filed: Oct. 9, 2013

(86) PCT No.: PCT/JP2013/077421
§ 371 (c)(1),
(2) Date: Apr. 2, 2015

(87) PCT Pub. No.: WO2014/057958
PCT Pub. Date: Apr. 17, 2014

(65) Prior Publication Data
US 2015/0258905 A1    Sep. 17, 2015

(30) Foreign Application Priority Data

Oct. 12, 2012 (JP) ................................ 2012-227102

(51) Int. Cl.
*B60L 11/18* (2006.01)
*H01R 13/506* (2006.01)
*H01R 13/56* (2006.01)
(Continued)

(52) U.S. Cl.
CPC ......... *B60L 11/1818* (2013.01); *H01R 13/502* (2013.01); *H01R 13/506* (2013.01); *H01R 13/562* (2013.01); *H01R 13/567* (2013.01);
(Continued)

(58) Field of Classification Search
CPC ....................... B60L 11/1818; H01R 2201/26
USPC ....................................................... 439/34, 35
See application file for complete search history.

(56) References Cited

U.S. PATENT DOCUMENTS 5,382,171 A * 1/1995 Hofmann ............. H01R 13/447
439/142
5,401,174 A * 3/1995 Hansen ............... B60L 11/1818
180/65.1
(Continued)

FOREIGN PATENT DOCUMENTS

DE    10 2008 048 657 A1    3/2010
JP         62-186384 U         11/1987
(Continued)

OTHER PUBLICATIONS

International Search Report of PCT/JP2013/077421 dated Dec. 24, 2013 [PCT/ISA/210].
(Continued)

*Primary Examiner* — Ross Gushi
(74) *Attorney, Agent, or Firm* — Sughrue Mion, PLLC

(57) ABSTRACT

A charging inlet device (1, 2, 3) includes: an inlet housing (10) fixed to a vehicle body panel (P) with a charging port (11A) open towards an outer side of a vehicle body; a terminal (20) arranged in the charging port (11A); and a rear connector (50) mounted to the inlet housing (10) on an opposite side from the charging port (11A) and having a wire lead-out terminal (52) connecting the terminal (20) and an electrical wire (W) routed through the vehicle body.

7 Claims, 19 Drawing Sheets

(51) Int. Cl.
    *H01R 13/74* (2006.01)
    *H01R 13/502* (2006.01)

(52) U.S. Cl.
    CPC ............ *H01R 13/74* (2013.01); *H01R 13/748* (2013.01); *H01R 2201/26* (2013.01)

(56) References Cited

U.S. PATENT DOCUMENTS

| | | | | |
|---|---|---|---|---|
| 5,417,579 A * | 5/1995 | Yoshioka | ............ | B60L 11/1818 439/310 |
| 5,458,496 A * | 10/1995 | Itou | ............ | B60L 11/1846 439/34 |
| 5,545,046 A * | 8/1996 | Masuda | ............ | B60K 1/04 439/142 |
| 5,556,284 A * | 9/1996 | Itou | ............ | B60L 11/1846 180/65.1 |
| 5,558,533 A | 9/1996 | Hashizawa et al. | | |
| 5,573,417 A | 11/1996 | Hashizawa et al. | | |
| 5,577,920 A * | 11/1996 | Itou | ............ | B60L 11/1846 439/310 |
| 5,582,521 A * | 12/1996 | Mori | ............ | B60L 11/1818 439/142 |
| 5,584,712 A * | 12/1996 | Fukushima | ............ | H01R 13/4538 439/140 |
| 5,637,977 A * | 6/1997 | Saito | ............ | B60L 11/1818 320/109 |
| 5,674,086 A | 10/1997 | Hashizawa et al. | | |
| 5,676,560 A * | 10/1997 | Endo | ............ | B60L 11/1818 439/310 |
| 5,751,135 A * | 5/1998 | Fukushima | ............ | B60L 11/1818 320/107 |
| 5,830,006 A * | 11/1998 | Koumatsu | ............ | H01R 13/5829 439/449 |
| 5,873,737 A * | 2/1999 | Hashizawa | ............ | B60L 11/1818 439/310 |
| 6,203,355 B1 * | 3/2001 | Neblett | ............ | B60L 11/1818 439/352 |
| 6,371,768 B1 * | 4/2002 | Neblett | ............ | B60L 11/1818 439/34 |
| 6,520,782 B2 * | 2/2003 | Mori | ............ | B60L 3/0069 439/138 |
| 7,643,271 B2 * | 1/2010 | Phillips | ............ | H02G 3/16 361/643 |
| 7,794,280 B1 * | 9/2010 | Markyvech | ............ | B60L 11/14 320/120 |
| 7,850,191 B1 * | 12/2010 | Kaminski | ............ | B60D 1/64 280/420 |
| 7,878,866 B1 * | 2/2011 | Kwasny | ............ | B60L 11/1818 439/474 |
| 7,887,352 B2 * | 2/2011 | Tamagawa | ............ | H01R 4/185 439/275 |
| 7,972,154 B2 * | 7/2011 | Pech | ............ | H01R 13/625 439/173 |
| 7,988,453 B2 * | 8/2011 | Loo | ............ | B60L 11/1818 439/142 |
| 8,016,604 B2 * | 9/2011 | Matsumoto | ............ | B60L 3/0069 439/304 |
| 8,075,329 B1 * | 12/2011 | Janarthanam | ............ | B60L 11/1818 439/304 |
| 8,123,535 B1 * | 2/2012 | Yeon | ............ | H01R 13/502 439/101 |
| 8,202,124 B1 * | 6/2012 | Natter | ............ | H01R 13/111 439/225 |
| 8,206,171 B2 * | 6/2012 | Osawa | ............ | H01R 13/502 439/352 |
| 8,215,656 B1 * | 7/2012 | Kaminski | ............ | B60D 1/64 280/420 |
| 8,226,284 B2 * | 7/2012 | Markyvech | ............ | B60L 3/0069 320/109 |
| 8,251,742 B2 * | 8/2012 | Takada | ............ | B60L 11/1818 439/271 |
| 8,257,101 B2 * | 9/2012 | Ichio | ............ | H01R 13/4367 439/206 |
| 8,317,376 B2 * | 11/2012 | Hook | ............ | B60L 11/1818 320/107 |
| 8,317,534 B2 * | 11/2012 | Osawa | ............ | B60L 11/1818 439/353 |
| 8,342,856 B2 * | 1/2013 | Takada | ............ | H01R 13/521 439/246 |
| 8,454,375 B2 * | 6/2013 | Bauer | ............ | H01R 13/447 439/135 |
| 8,529,273 B2 * | 9/2013 | Maegawa | ............ | B60L 11/1818 439/206 |
| 8,562,370 B2 * | 10/2013 | Takagi | ............ | H01R 13/6275 439/345 |
| 8,597,039 B2 * | 12/2013 | Osawa | ............ | H01R 13/5227 439/205 |
| 8,628,225 B2 * | 1/2014 | Hook | ............ | B60L 11/1818 320/107 |
| 8,651,875 B2 * | 2/2014 | Ferguson | ............ | H01R 13/6397 439/34 |
| 8,662,910 B2 * | 3/2014 | Ichio | ............ | H01R 13/5208 439/206 |
| 8,668,506 B2 * | 3/2014 | Stack | ............ | B60L 11/1818 439/136 |
| 8,684,443 B2 * | 4/2014 | Hara | ............ | B60R 19/48 296/97.22 |
| 8,690,591 B2 * | 4/2014 | Charnesky | ............ | B60L 11/1818 191/12.4 |
| 8,740,632 B2 * | 6/2014 | Osawa | ............ | H01R 13/50 439/76.2 |
| 8,827,731 B2 * | 9/2014 | Sasaki | ............ | B60L 11/1818 439/206 |
| 8,845,155 B2 * | 9/2014 | Rotenberg | ............ | H01R 13/70 307/10.8 |
| 8,853,996 B2 * | 10/2014 | Sekido | ............ | B60L 11/1803 180/65.1 |
| 8,858,256 B2 * | 10/2014 | Mori | ............ | H01R 13/74 439/564 |
| 8,882,525 B2 * | 11/2014 | Mori | ............ | B60L 11/1818 439/310 |
| 8,888,515 B2 * | 11/2014 | Hachadorian | ............ | H01R 13/5213 439/142 |
| 8,905,768 B2 * | 12/2014 | Hara | ............ | B60L 11/1818 439/136 |
| 8,932,065 B2 * | 1/2015 | Gerling | ............ | B60D 1/64 439/35 |
| 8,956,190 B2 * | 2/2015 | Natter | ............ | B60L 3/0069 439/34 |
| 9,093,777 B2 * | 7/2015 | Kojima | ............ | H01R 13/5213 |
| 9,106,015 B2 * | 8/2015 | Ohmura | ............ | H01R 13/6275 |
| 9,147,960 B2 * | 9/2015 | Kojima | ............ | H01R 13/447 |
| 9,150,172 B2 * | 10/2015 | Matsuda | ............ | B60L 11/18 |
| 9,156,396 B2 * | 10/2015 | Hook | ............ | B60L 11/1818 |
| 9,174,592 B2 * | 11/2015 | Takaka | ............ | B60L 11/1818 |
| 9,199,589 B2 * | 12/2015 | Osawa | ............ | B60L 11/18 |
| 9,225,109 B2 * | 12/2015 | Sasaki | ............ | H01R 13/627 |
| 9,231,343 B2 * | 1/2016 | Yuasa | ............ | H01R 13/6272 |
| 9,233,615 B2 * | 1/2016 | Matsuda | ............ | B60L 11/18 |
| 2001/0050471 A1 * | 12/2001 | McCoy | ............ | B60D 1/485 280/504 |
| 2002/0115319 A1 * | 8/2002 | Mori | ............ | B60L 3/0069 439/136 |
| 2005/0176265 A1 * | 8/2005 | Jacobs | ............ | H01R 13/502 439/35 |
| 2005/0181635 A1 * | 8/2005 | Molinaro | ............ | H01R 9/2458 439/35 |
| 2009/0176382 A1 * | 7/2009 | Chen | ............ | H01R 27/02 439/35 |
| 2010/0227505 A1 | 9/2010 | Markyvech | | |
| 2011/0034053 A1 * | 2/2011 | Matsumoto | ............ | B60L 3/0069 439/304 |
| 2011/0212645 A1 * | 9/2011 | Osawa | ............ | H01R 13/502 439/352 |
| 2011/0223792 A1 * | 9/2011 | Osawa | ............ | B60L 11/1818 439/345 |
| 2011/0287636 A1 * | 11/2011 | Zwickler | ............ | B60R 16/0222 439/34 |
| 2011/0287667 A1 * | 11/2011 | Ichio | ............ | H01R 13/4367 439/660 |
| 2012/0108097 A1 * | 5/2012 | Takagi | ............ | H01R 13/6275 439/345 |
| 2012/0156896 A1 * | 6/2012 | Corless | ............ | H01R 13/447 439/35 |

(56) References Cited

U.S. PATENT DOCUMENTS

| | | | | |
|---|---|---|---|---|
| 2012/0258617 A1* | 10/2012 | Osawa | ............... | H01R 13/5227 439/205 |
| 2012/0322302 A1* | 12/2012 | Mori | ................. | H01R 13/74 439/573 |
| 2013/0012054 A1* | 1/2013 | Andresen | ............ | B60L 11/1818 439/476.1 |
| 2013/0224969 A1* | 8/2013 | Sasaki | ................ | B60L 11/1818 439/34 |
| 2014/0042964 A1* | 2/2014 | Arabia, Jr. | ............. | E05B 83/00 320/109 |
| 2014/0111144 A1* | 4/2014 | Mo | ................... | H01R 13/6392 320/107 |
| 2014/0127924 A1* | 5/2014 | Kim | ................ | H01R 13/62933 439/299 |
| 2014/0170889 A1* | 6/2014 | Kahara | ............. | H01R 13/6397 439/352 |
| 2014/0184158 A1* | 7/2014 | Osawa | ................ | H01R 13/639 320/109 |
| 2014/0242818 A1* | 8/2014 | Ohmura | ............. | B60L 11/1818 439/155 |
| 2014/0285148 A1* | 9/2014 | Osawa | ................ | H01R 13/639 320/109 |
| 2014/0292276 A1* | 10/2014 | Osawa | ................ | H01R 13/639 320/109 |
| 2015/0004827 A1* | 1/2015 | Seelig | ................. | H01R 13/502 439/345 |
| 2015/0011098 A1* | 1/2015 | Rotenberg | ............ | H01R 13/70 439/35 |
| 2015/0111408 A1* | 4/2015 | Sasaki | ................. | H01R 13/627 439/357 |
| 2015/0137755 A1* | 5/2015 | Sadano | .............. | B60L 11/1818 320/109 |
| 2015/0137756 A1* | 5/2015 | Fukushima | .......... | H01R 13/447 320/109 |
| 2015/0222049 A1* | 8/2015 | Armacost | ................ | B60D 1/64 439/312 |
| 2015/0229055 A1* | 8/2015 | Fukushima | ............ | H01R 13/08 439/733.1 |
| 2015/0258905 A1* | 9/2015 | Fukushima | .......... | H01R 13/506 439/34 |
| 2015/0325948 A1* | 11/2015 | Kurita | ................ | H01R 13/5227 439/206 |
| 2015/0325961 A1* | 11/2015 | Blakborn | ............. | H01R 13/713 439/271 |
| 2015/0343914 A1* | 12/2015 | Osawa | ................ | B60L 11/1818 439/205 |
| 2015/0364877 A1* | 12/2015 | Osawa | ................ | H01R 13/748 439/34 |
| 2016/0006156 A1* | 1/2016 | Shimizu | ................... | H01R 4/72 439/310 |
| 2016/0013580 A1* | 1/2016 | Matsuda | ............ | H01R 13/5202 439/190 |
| 2016/0013587 A1* | 1/2016 | Shimizu | ............. | H01R 13/5227 439/153 |

FOREIGN PATENT DOCUMENTS

| | | |
|---|---|---|
| JP | 10-275653 A | 10/1998 |
| JP | 2008-034303 A | 2/2008 |
| JP | 2011-175764 A | 9/2011 |
| JP | 2012-084273 A | 4/2012 |
| JP | 2013-178943 A | 9/2013 |
| JP | 2014053091 A | 3/2014 |
| WO | 2012/086430 A1 | 6/2012 |

OTHER PUBLICATIONS

Communication dated May 10, 2016, from the Japanese Patent Office in counterpart application No. 2012-227102.

Communication dated Apr. 29, 2016 from European Patent Office in counterpart Application No. 13845720.5.

* cited by examiner

CHARGING INLET DEVICE

TECHNICAL FIELD

The present invention relates to a charging inlet device mounted on a vehicle, such as an electric vehicle or hybrid electric vehicle.

BACKGROUND ART

In order to charge a battery mounted on the vehicle body of an electric vehicle (EV), hybrid electric vehicle (HEV), etc., the vehicle is provided with a charging inlet device with which a charging connector is mated (see Patent Literature 1). An example of such a charging inlet device is described with reference to FIGS. 1 to 3.

As shown in FIG. 1, a charging inlet device 100 includes an inlet housing 110. The inlet housing 110 includes an inlet body 120 having a charging port 121, a connector housing 130 arranged in the inlet body 120, and a vehicle body mounting flange 140 projecting outwardly from the inlet body 120.

The charging port 121 of the inlet body 120 is open towards the outer side of a vehicle body. As shown in FIG. 2, the connector housing 130 defines terminal receiving chambers 131 in which terminals 150 in contact with respective mating terminals (not shown) are arranged. Each terminal receiving chamber 131 has a wire exit hole 132 on the side opposite to the side from which a charging connector (not shown) is inserted.

Upon insertion into the connector housing 130, each terminal 150 is inserted into the terminal receiving chamber 131 from the wire exit hole 132 and engaged with a lance 133 in the fully inserted position (see FIG. 2). The terminal 150 is received in the terminal receiving chamber 131 and held in place by the engagement force of the lance 133.

In the following, mounting of the above-described charging inlet device 100 to the vehicle body is described with reference to FIG. 3. As shown in FIG. 3, an electrical wire W is first inserted into an inlet mounting hole P1 of a vehicle body panel P from the outer side of the vehicle body. The charging inlet device 100 is then inserted into the inlet mounting hole P1 and the vehicle body mounting flange 140 is mounted on the vehicle body panel P. The vehicle body mounting flange 140 and the vehicle body panel P are finally fastened by bolts or the like (not shown), thus completing the mounting.

CITATION LIST

Patent Literature

Patent Literature 1: Japanese Unexamined Patent Application Publication No. 10-275653

SUMMARY OF INVENTION

However, since the electrical wire W is directly connected to the rear end portion of the terminal 150 in the related charging inlet device 100 described above, the electrical wire W is pulled in the axial direction of the terminal 150. As such, if a width WP of the inside space of the vehicle body panel P is narrow, the electrical wire W needs to be routed while being sharply bent and it is cumbersome to route the electrical wire W. In some cases accessories (resistor, drain wire, corrugated tube, joint terminal, etc.) are added to the electrical wire W, in which cases it is more cumbersome to route the electrical wire W.

An object of the present invention is to provide a charging inlet device in which an electrical wire could be easily routed without being sharply bent if a width of the inside space of the vehicle body panel is narrow.

A charging inlet device in accordance with some embodiments of the present invention includes: an inlet housing fixed to a vehicle body panel with a charging port open towards an outer side of a vehicle body; a terminal arranged in the charging port; and a rear connector mounted to the inlet housing on an opposite side from the charging port and having a wire lead-out terminal connecting the terminal and an electrical wire routed through the vehicle body.

The charging inlet device may further include an inner housing interposed between the inlet housing and the rear connector and securing the terminal, wherein the inlet housing may include an inlet body defining the charging port and a connector housing in which the terminal is arranged.

The inlet housing may include an inlet body defining the charging port and a connector housing in which the terminal is arranged, and the terminal may be formed integrally with the wire lead-out terminal and is fixed to the rear connector.

The rear connector may include a connector housing in which the terminal is arranged, and the terminal is formed integrally with the wire lead-out terminal and is fixed to the rear connector.

The above-described configuration provides the rear connector having the wire lead-out terminal in addition to the inlet housing. Thus, the orientation of the wire connection side of the wire lead-out terminal can be set regardless of the orientation of the terminal and the wire exit direction can be set freely. Hence, the electrical wire could be easily routed without being sharply bent if a width of the inside space of the vehicle body panel is narrow.

DESCRIPTION OF EMBODIMENTS

Figure 1:
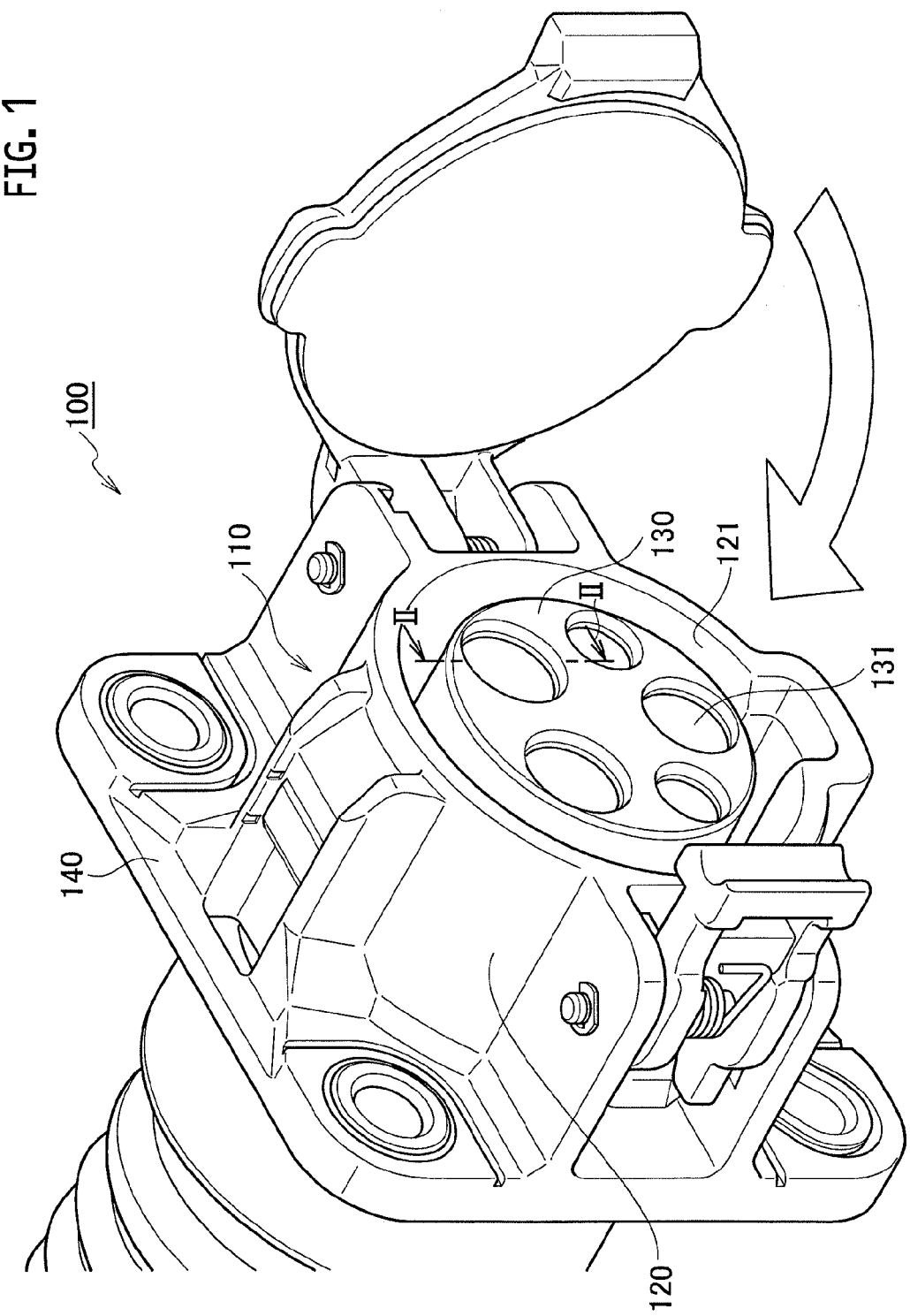
FIG. 1 is a perspective view illustrating a charging inlet device according to a related art.
Figure 2:
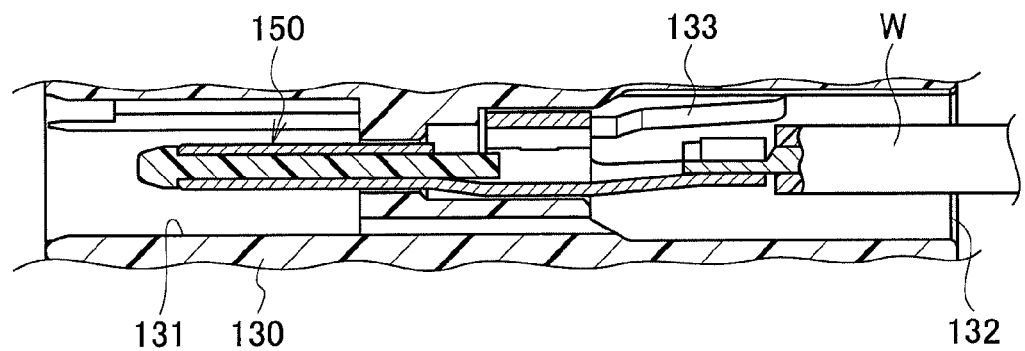
FIG. 2 is a longitudinal sectional view (i.e., II-II cross-sectional view of FIG. 1) of the charging inlet device according to the related art.
Figure 3:
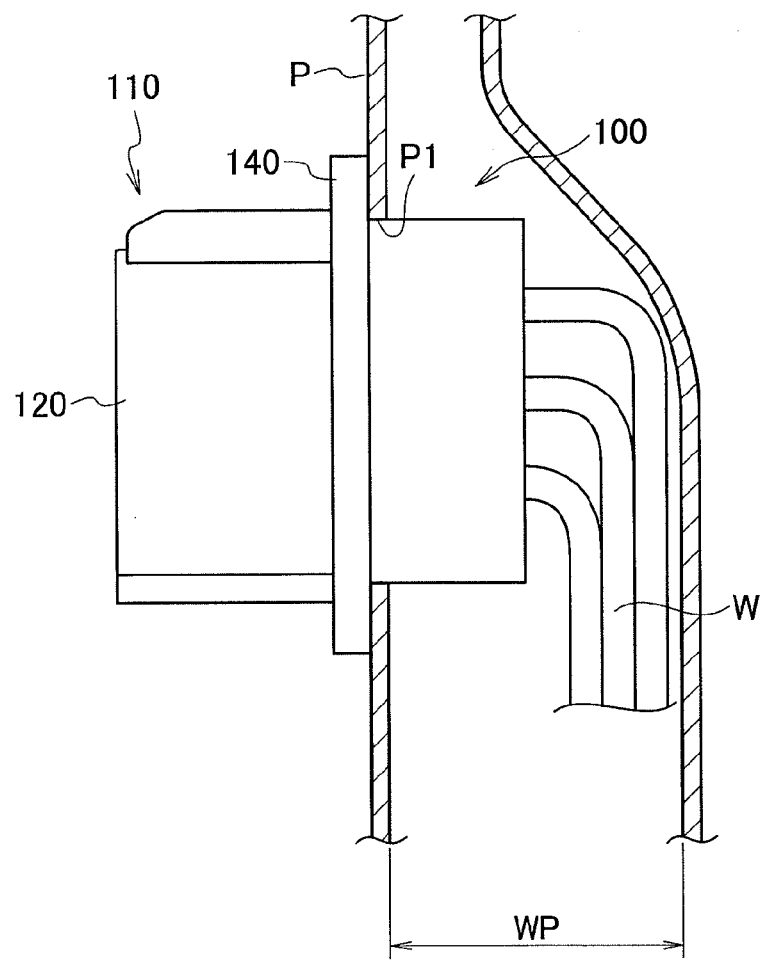
FIG. 3 is a view illustrating an assembled state of the charging inlet device according to the related art to a vehicle body panel.

Charging inlet devices according to embodiments of the present invention are described below with reference to the drawings. In the following drawings, the same or similar elements are denoted by the same or similar reference numerals. It should be noted that the drawings are schematic and dimensional ratios are different from real ones, for example. Accordingly, specific dimensions and the like should be determined in consideration of the following description. The drawings may also include portions having relationships and ratios of dimensions different from one another.

First Embodiment

Configuration of Charging Inlet Device

The configuration of a charging inlet device 1 according to a first embodiment will now be described with reference to the figures. FIGS. 4 to 11 illustrate the charging inlet device 1 of the first embodiment.

Figure 4:
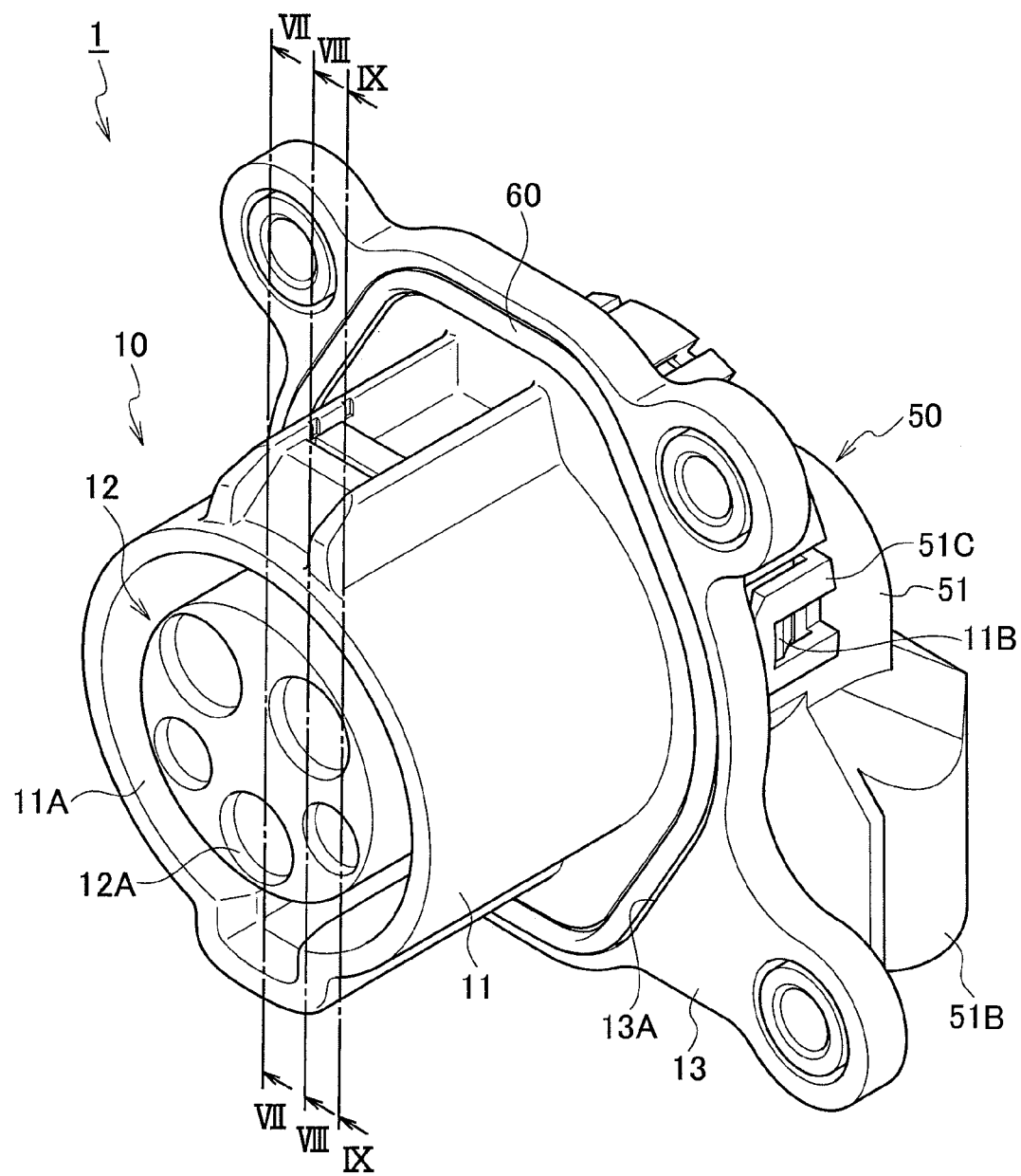
FIG. 4 is a front assembly perspective view of a charging inlet device according to a first embodiment.
Figure 5:
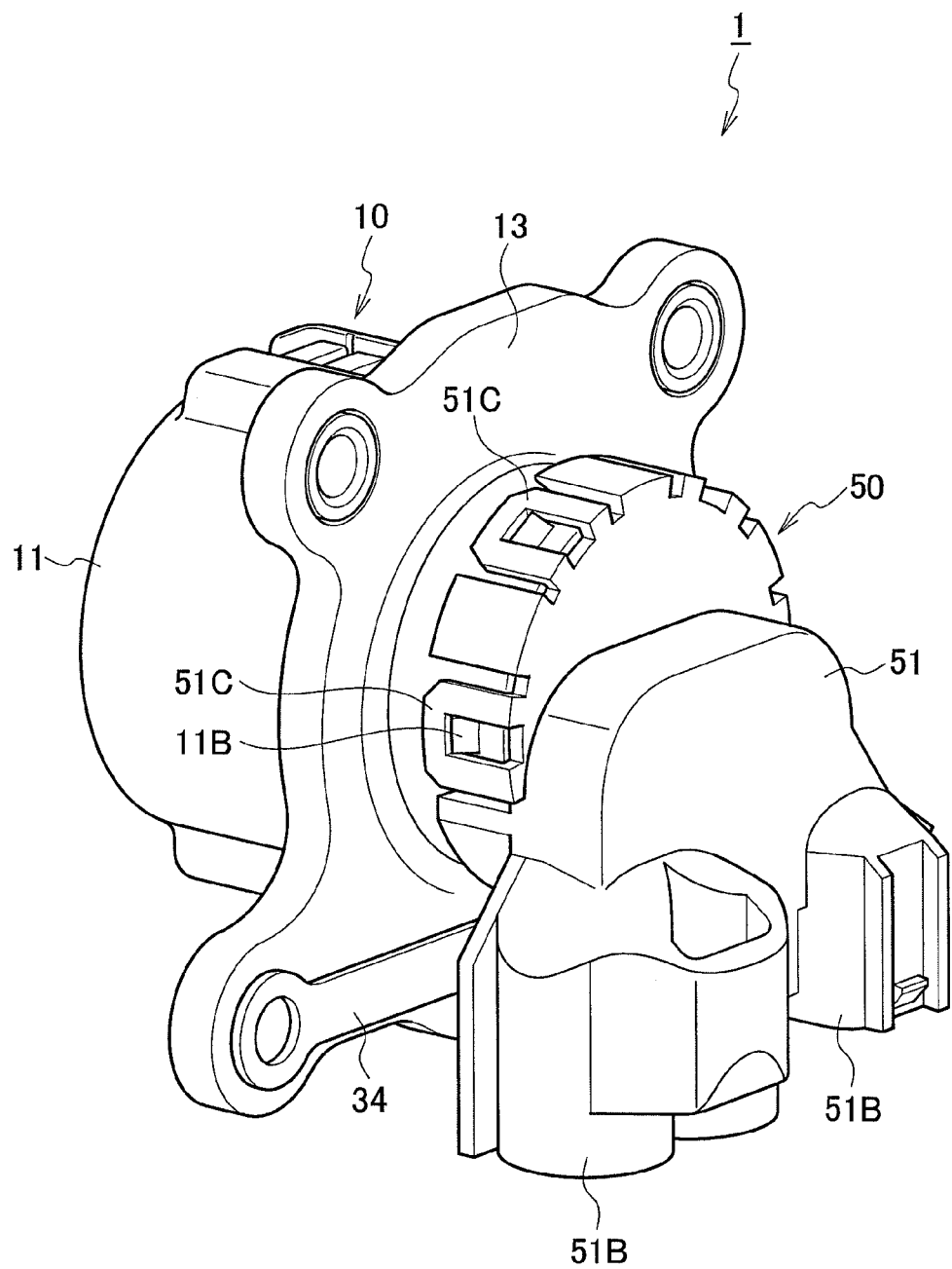
FIG. 5 is a rear assembly perspective view of the charging inlet device according to the first embodiment.
Figure 6:
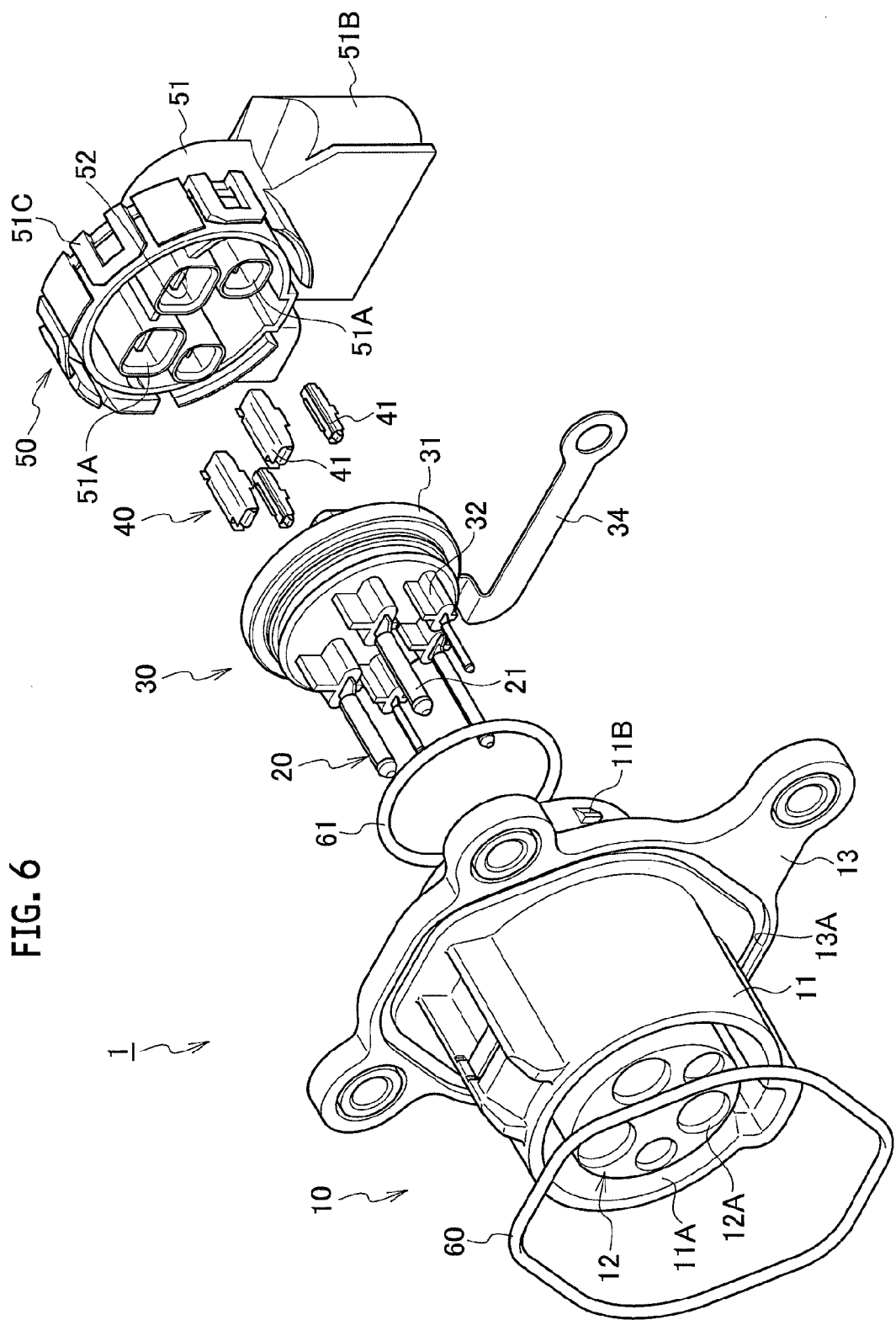
FIG. 6 is an exploded perspective view illustrating the charging inlet device according to the first embodiment.

As shown in FIGS. 4 to 6, the charging inlet device 1 is configured to mate with a charging connector (not shown) having a mating terminal (not shown). The charging inlet device 1 includes an inlet housing 10 that is fixed to a vehicle body panel P (see FIG. 11) with a charging port 11A open towards the outer side of a vehicle body, terminals 20 arranged in the charging port 11A, an inner housing 30 for securing the terminals 20, junction terminals 40 for connecting the terminals 20 and a rear connector 50 (wire lead-out terminals 52 described below), and the rear connector 50 that is mounted to the inlet housing 10 on the opposite side of the charging port 11A and has wire lead-out terminals 52 for connecting the junction terminals 40 and an electrical wire W (see FIG. 11) routed through the vehicle body.

The inlet housing 10 includes an inlet body 11 having the charging port 11A, a connector housing 12 arranged in the inlet body 11, and a vehicle body mounting flange 13 that projects outwardly from the inlet body 11 and is mounted on the vehicle body panel P.

The charging port 11A of the inlet body 11 is open towards the outer side of a vehicle body. The outer periphery of the inlet body 11 on the opposite side of the charging port 11A is provided with claws 11B (see FIGS. 4 to 6). The connector housing 12 defines terminal receiving chambers 12A in which the terminals 20 in contact with the mating terminals (not shown) are arranged. The vehicle body mounting flange 13 is formed with a packing groove 13A into which a packing 60 is inserted.

The terminals 20 include a charging terminal, signal terminal, ground terminal, etc. The terminals 20 are mounted to the inner housing 30. The terminal 20 has a mating terminal contact portion 21 that is arranged in the terminal receiving chamber 12A and comes in contact with the mating terminal (not shown) and a junction terminal contact portion 22 that is fixed to the inner housing 30 and comes in contact with the junction terminal 40 (see FIGS. 8 and 9).

The inner housing 30, which is interposed between the inlet housing 10 and the rear connector 50, secures the terminals 20. The inner housing 30 is mounted through a packing 61 (see FIG. 6) to the inlet housing 10.

Figure 10:
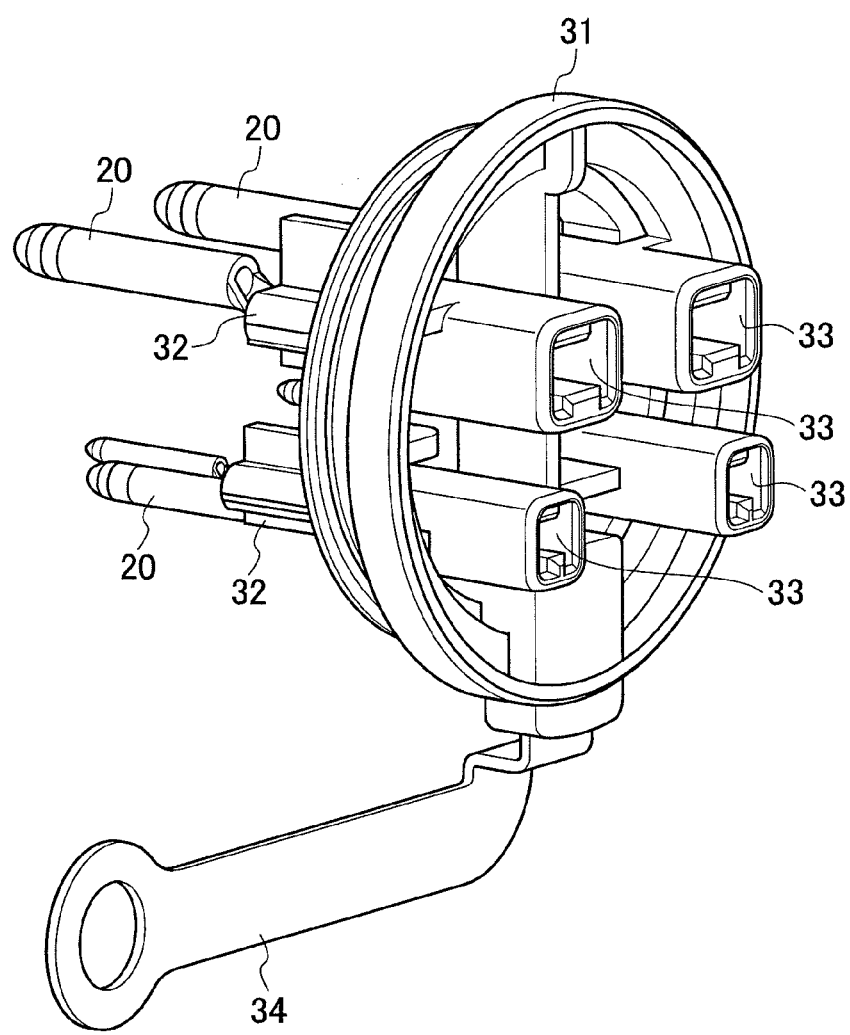
FIG. 10 is a perspective view illustrating terminals and an inner housing according to the first embodiment.

As shown in FIG. 10, the inner housing 30 includes a disk-shaped inner body 31, terminal support sections 32 that are provided on the side from which the charging connector (not shown) is inserted and hold the terminals 20, and junction terminal receiving chambers 33 that are formed on the opposite side of the terminal support sections 32 and into which the junction terminals 40 are inserted.

The inner body 31 is provided with a grounding portion 34 connected to a terminal 20 (ground terminal). The grounding portion 34 is electrically connected with the vehicle body panel P when the charging inlet device 1 is assembled to the vehicle body panel P and the vehicle body mounting flange 13 of the inlet housing 10 and the vehicle body panel P are fastened by bolts or the like.

The junction terminal 40, which is interposed between the inner housing 30 and the rear connector 50, connects the terminal 20 and the wire lead-out terminal 52 of the rear connector 50 on the opposite side of the charging port 11A. The junction terminal 40 includes a box-shaped junction body 41 and a first spring contact portion 42 and a second spring contact portion 43 (see FIGS. 8 and 9) provided in (the bottom of) the junction body 41. The first spring contact portion 42 holds the junction terminal contact portion 22 of the terminal 20. The second spring contact portion 43 holds the wire lead-out terminal 52 of the rear connector 50.

Figure 7:
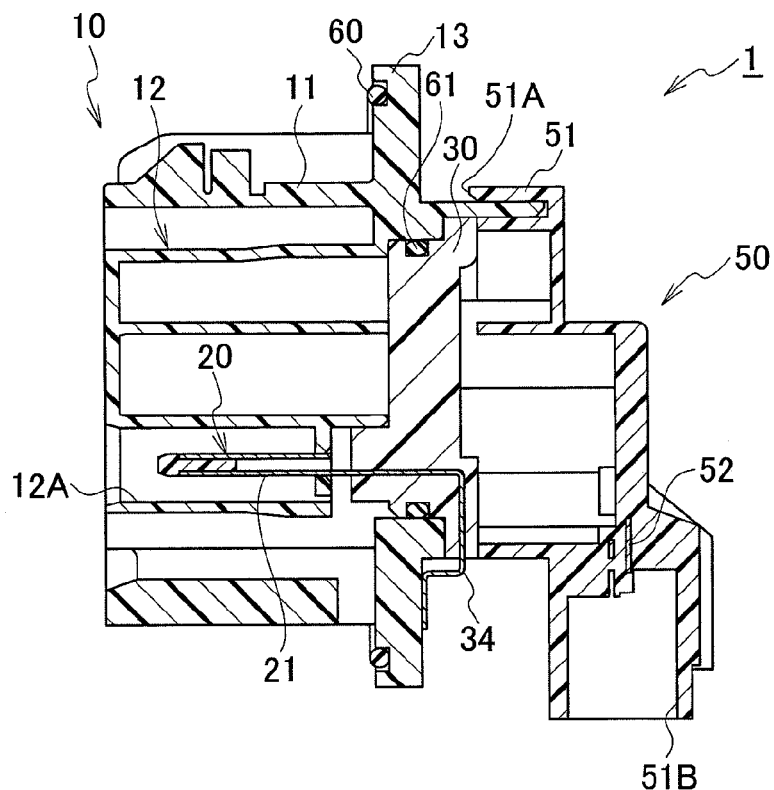
FIG. 7 is a VII-VII cross-sectional view of FIG. 4.
Figure 8:
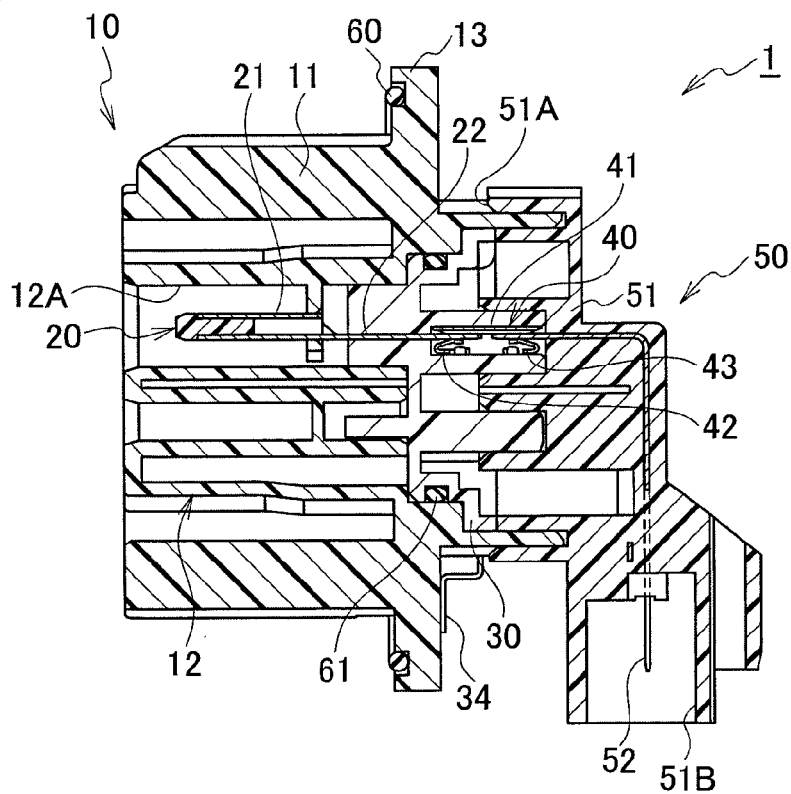
FIG. 8 is a VIII-VIII cross-sectional view of FIG. 4.
Figure 9:
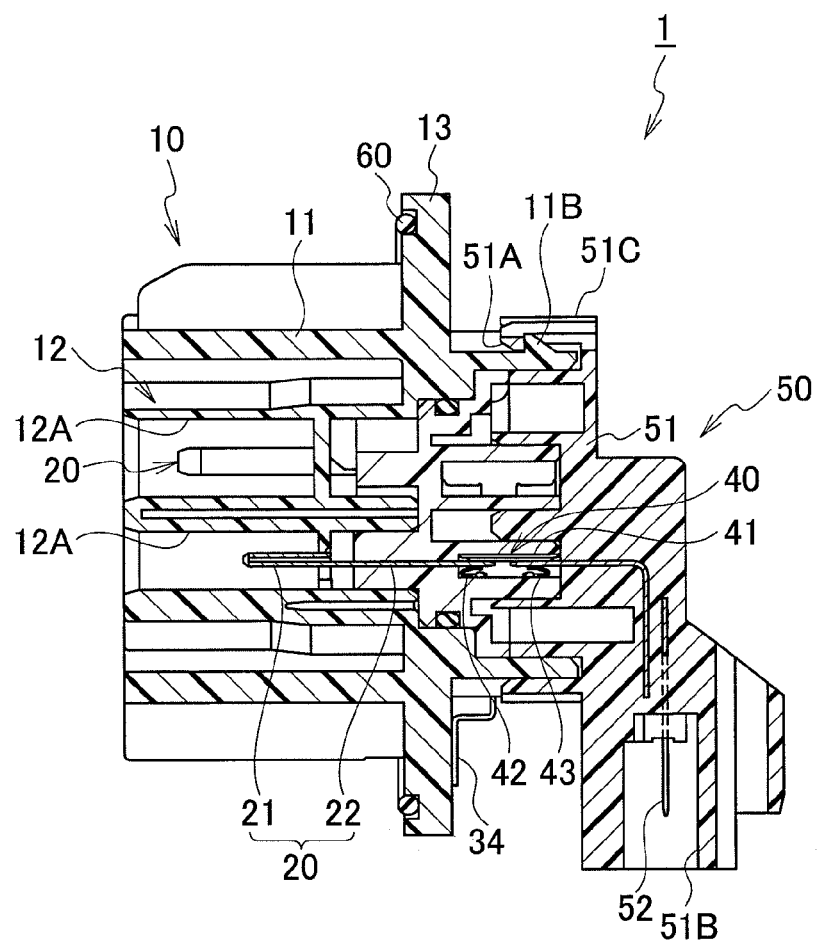
FIG. 9 is a IX-IX cross-sectional view of FIG. 4.

The rear connector 50 is mounted to the inlet body 11 of the inlet housing 10. The rear connector 50 connects the junction terminals 40 and a connector C (see FIG. 11) that is fixed to the end of the electrical wire W. As shown in FIGS. 7 and 8, the rear connector 50 includes a rear body 51 and the wire lead-out terminals 52 provided in the rear body 51.

The rear body 51 is provided with junction-side openings 51A for receiving the junction terminals 40 and a connector insertion section 51B that is provided in the direction orthogonal to the insertion direction of the charging connector (not shown), i.e., in the downward direction of the first embodiment, and into which the connector C is inserted. The outer periphery of the rear body 51 is provided with engagement arms 51C, each engaging with the claw 11B of the inlet body 11.

The wire lead-out terminal 52, which is insert-molded in the rear connector 50, is bent in an L-shape extending in the insertion direction of the charging connector (not shown) and then in the direction orthogonal thereto. That is, one end of the wire lead-out terminal 52 is held on the junction-side opening 51A side by the second spring contact portion 43 and is connected to the terminal 20. On the other hand, the other end of the wire lead-out terminal 52 projects into the connector insertion section 51B of the rear connector 50 and is connected to a terminal (not shown) of the connector C (see FIG. 11) that is fixed to the end of the terminal of the electrical wire W.

(Mounting of Charging Inlet Device)

Figure 11:
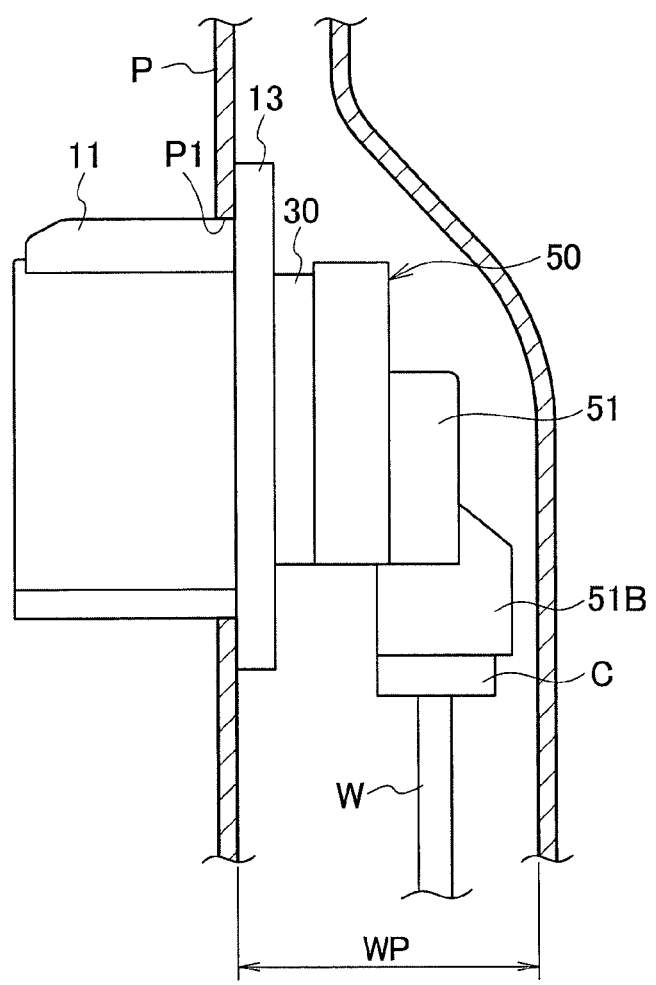
FIG. 11 is a view illustrating an assembled state of the charging inlet device according to the first embodiment to a vehicle body panel.
Figure 12:
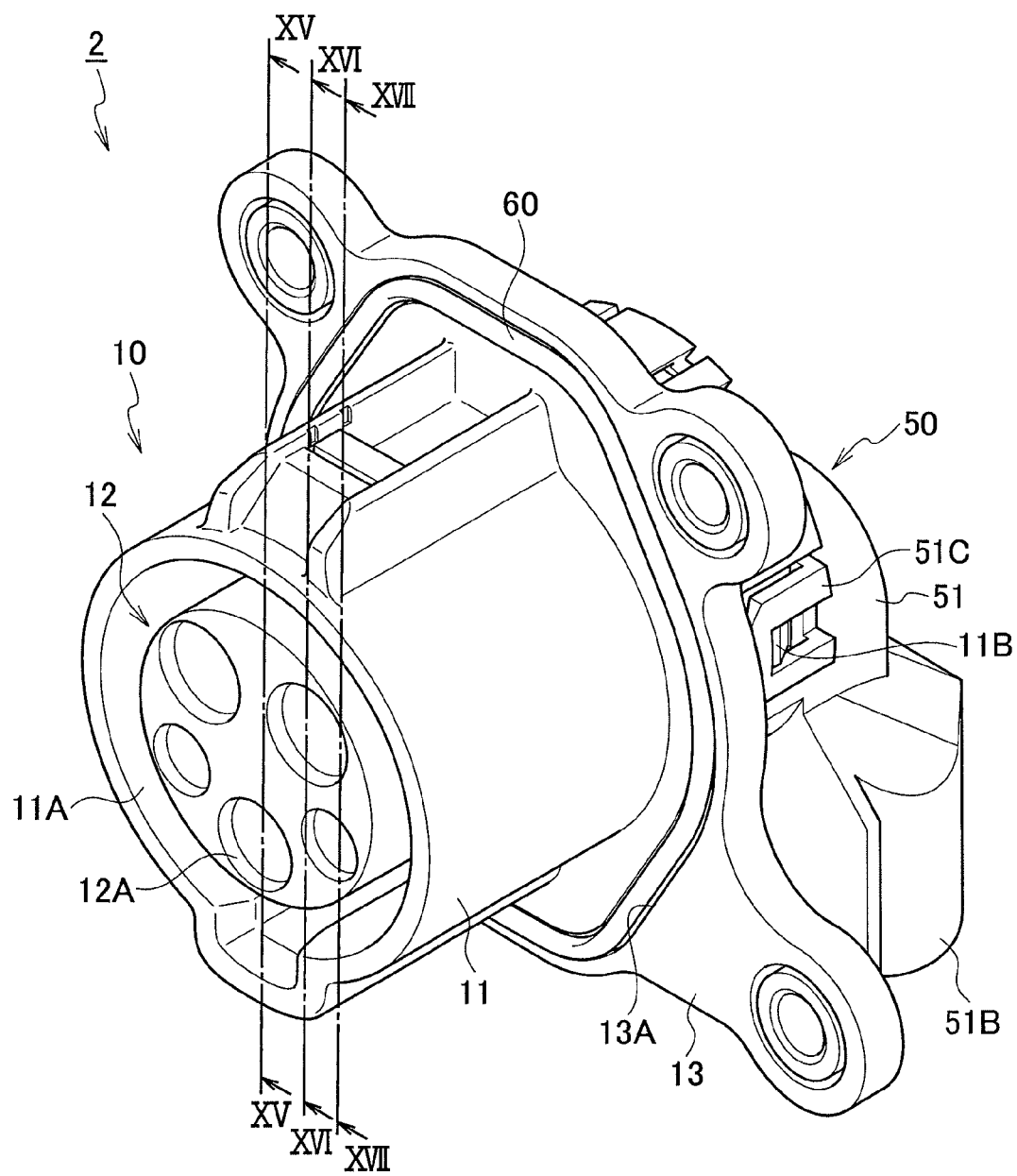
FIG. 12 is a front assembly perspective view of a charging inlet device according to a second embodiment.
Figure 13:
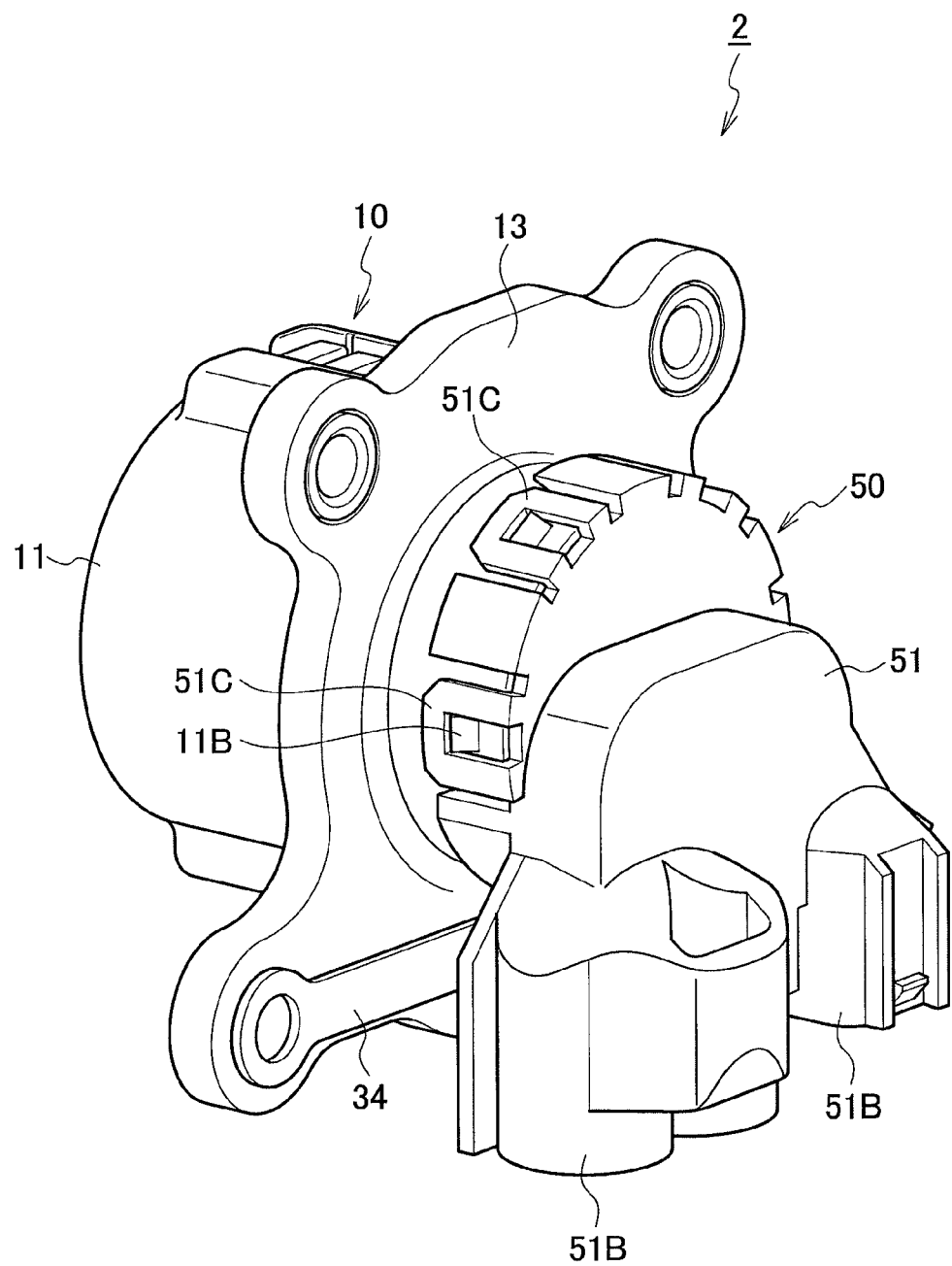
FIG. 13 is a rear assembly perspective view of the charging inlet device according to the second embodiment.
Figure 14:
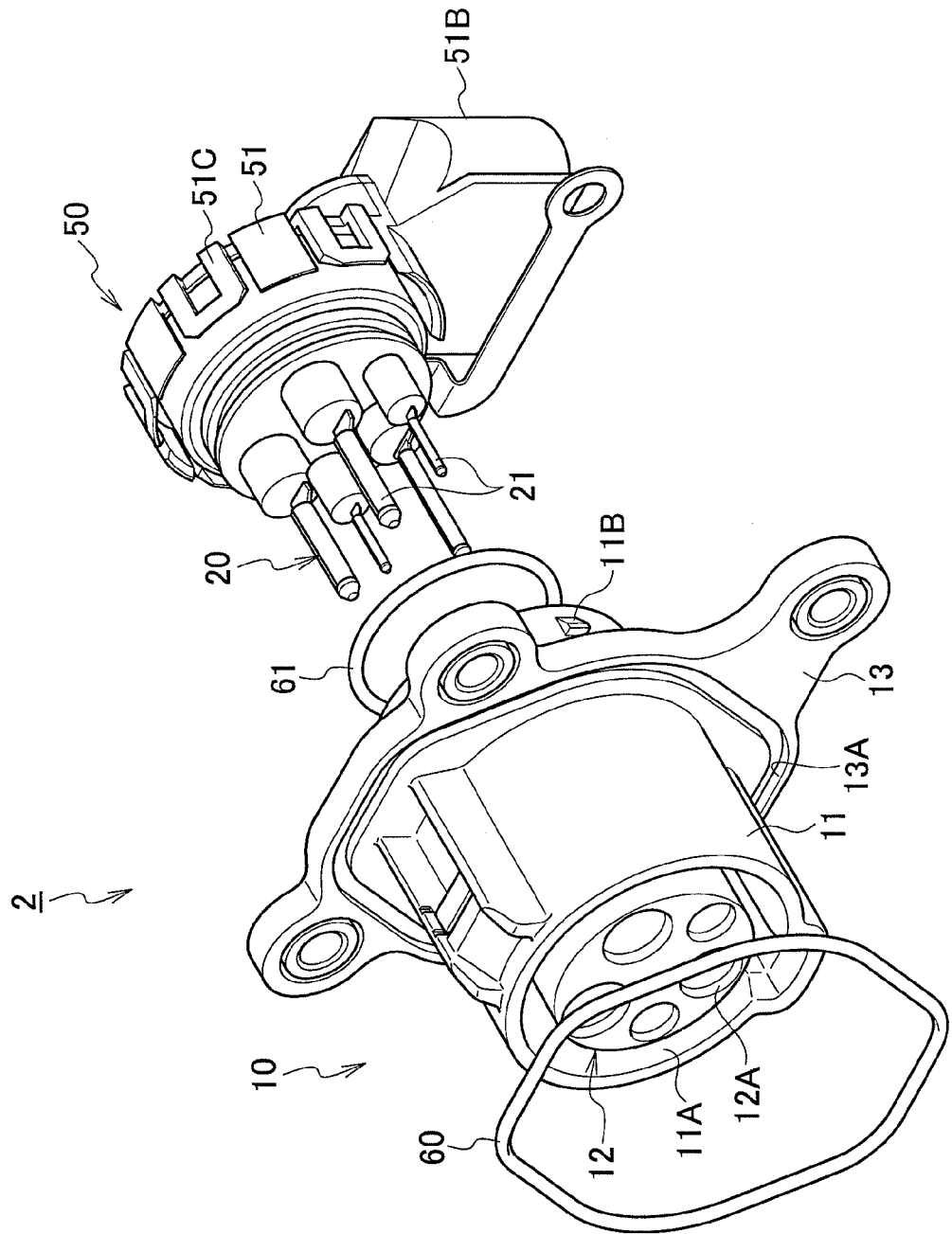
FIG. 14 is an exploded perspective view illustrating the charging inlet device according to the second embodiment.

Mounting of the above-described charging inlet device 1 to the vehicle body panel P will now be briefly described with reference to FIGS. 6 and 11. FIG. 11 is a view illustrating an assembled state of the charging inlet device 1 according to the first embodiment to the vehicle body panel P.

First, as shown in FIG. 6, the inlet housing 10, the terminals 20, the inner housing 30, the junction terminals 40, and the rear connector 50 are assembled into the charging inlet device 1.

Then, as shown in FIG. 11, the charging inlet device 1 is inserted into the inlet mounting hole P1 of the vehicle body panel P from the inside of the vehicle body panel P and the vehicle body mounting flange 13 is mounted on the vehicle body panel P. Finally, the vehicle body mounting flange 13 and the vehicle body panel P are fastened by bolts or the like, thus completing the mounting.

Here, the connector C fixed to the electrical wire W that is routed through the vehicle body side may be fitted in the connector insertion section 51B of the rear connector 50 when the charging inlet device 1 is assembled, or may be fitted in the connector insertion section 51B of the rear connector 50 after the charging inlet device 1 has been fastened to the vehicle body panel P by bolts or the like.

Advantageous Effects

The first embodiment described above includes the rear connector 50 having the wire lead-out terminals 52 in addition to the inlet housing 10. Thus, the orientation of the electrical wire W connection side (connector C side) of the wire lead-out terminal 52 can be set regardless of the orientation of the terminal 20 and the exit direction of the electrical wire W can be set freely (it is set downward in the first embodiment). Hence, the electrical wire W could be easily routed without being sharply bent if a width WP (see FIG. 11) of the inside space of the vehicle body panel P is narrow.

In the first embodiment, the inner housing 30 for securing the terminals 20 is interposed between the inlet housing 10 and the rear connector 50. Thus, mounting of the inner housing 30 to the inlet housing 10 allows the mating terminal contact portion 21 of the terminal 20 to be placed in position in the terminal receiving chamber 12A of the connector housing 12.

Second Embodiment

A charging inlet device 2 according to a second embodiment will now be described with reference to the drawings. FIGS. 12 to 17 illustrate the charging inlet device 2 of the second embodiment. The same elements as those of the charging inlet device 1 according to the first embodiment described above are denoted by the same reference numerals and elements different from those of the charging inlet device 1 will be mainly described.

The charging inlet device 1 has the inner housing 30 and the junction terminals 40 in the first embodiment above, while the charging inlet device 2 has no inner housing 30 and no junction terminals 40 in the second embodiment.

Figure 15:
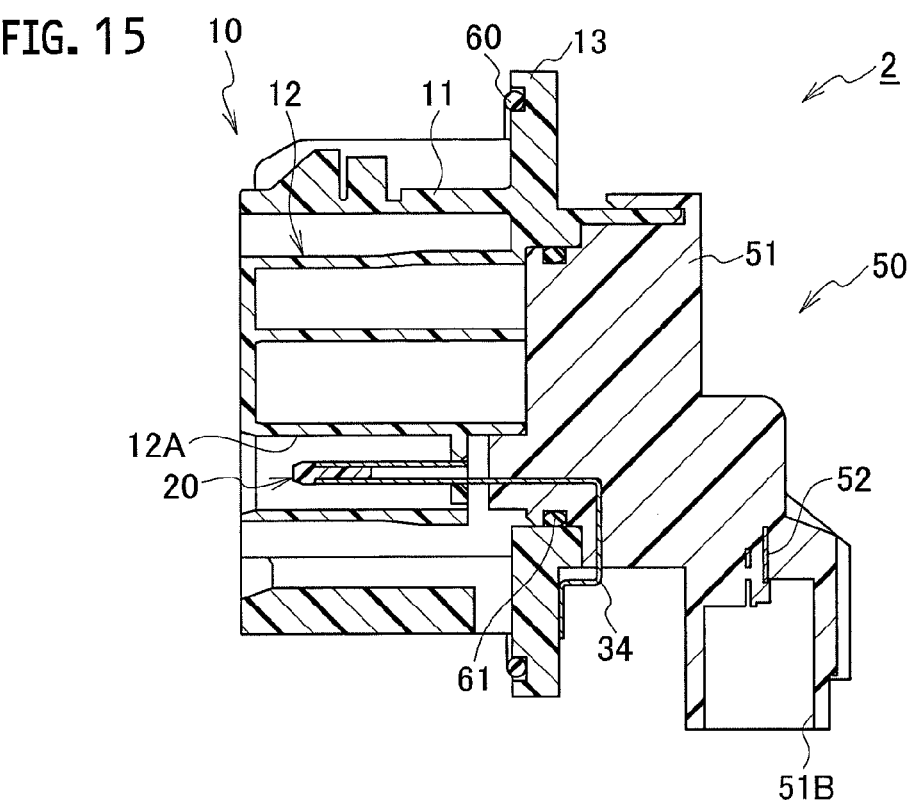
FIG. 15 is a XV-XV cross-sectional view of FIG. 12.
Figure 16:
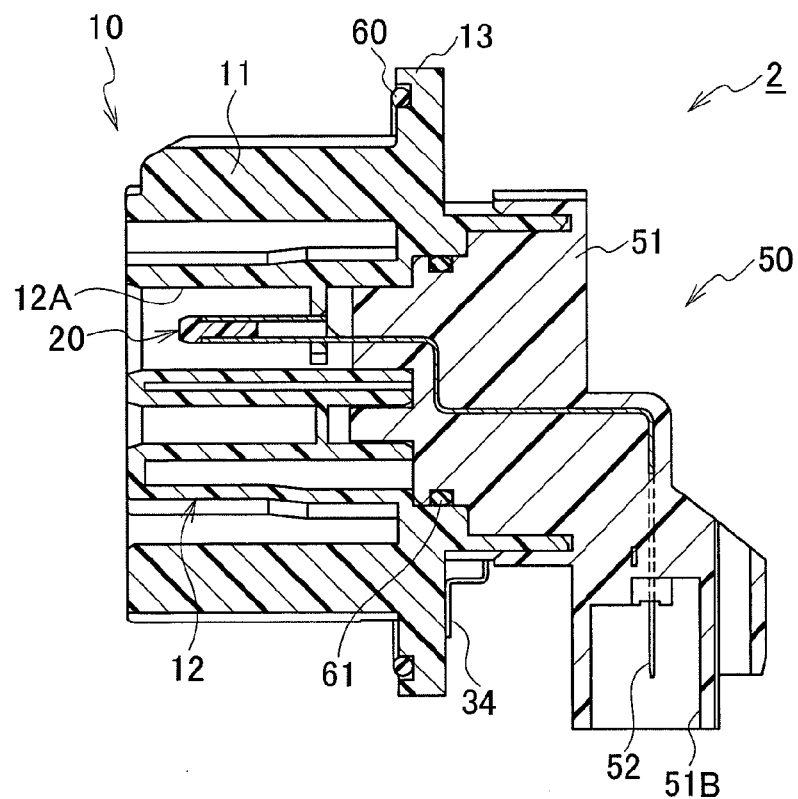
FIG. 16 is a XVI-XVI cross-sectional view of FIG. 12.
Figure 17:
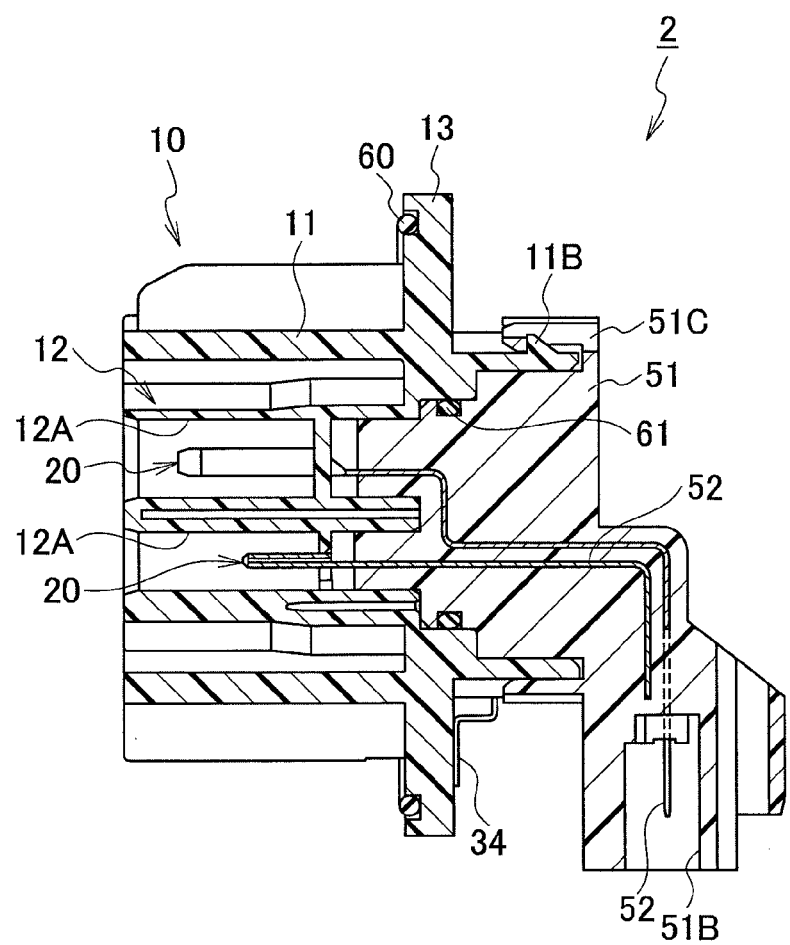
FIG. 17 is a XVII-XVII cross-sectional view of FIG. 12.

Specifically, as shown in FIGS. 12 to 17, each of terminals 20 is formed integrally with a wire lead-out terminal 52 and is fixed to a rear connector 50. A rear body 51 of the rear connector 50 has no elements corresponding to the junction terminal receiving chambers 33 as shown in FIGS. 15 to 17.

In the second embodiment described above, like in the first embodiment, the direction of the electrical wire W exit can be set freely and the electrical wire W could be easily routed without being sharply bent if the width WP of the inside space of the vehicle body panel P is narrow.

In the second embodiment, the terminal 20 is formed integrally with the wire lead-out terminal 52 and is fixed to the rear connector 50. This reduces the number of terminal connection points and improves connection reliability.

Third Embodiment

A charging inlet device 3 according to a third embodiment will now be described with reference to the drawings. FIGS. 18 to 23 illustrate the charging inlet device 3 of the third embodiment. The same elements as those of the charging inlet devices 1 and 2 according to the first and second embodiments described above are denoted by the same reference numerals and elements different from those of the charging inlet devices 1 and 2 will be mainly described.

In the third embodiment, like in the second embodiment, the charging inlet device 3 has no inner housing 30 and no junction terminals 40.

Specifically, as shown in FIGS. 18 to 23, each of terminals 20 is formed integrally with a wire lead-out terminal 52 and is fixed to a rear connector 50 in the same manner as the second embodiment.

Figure 18:
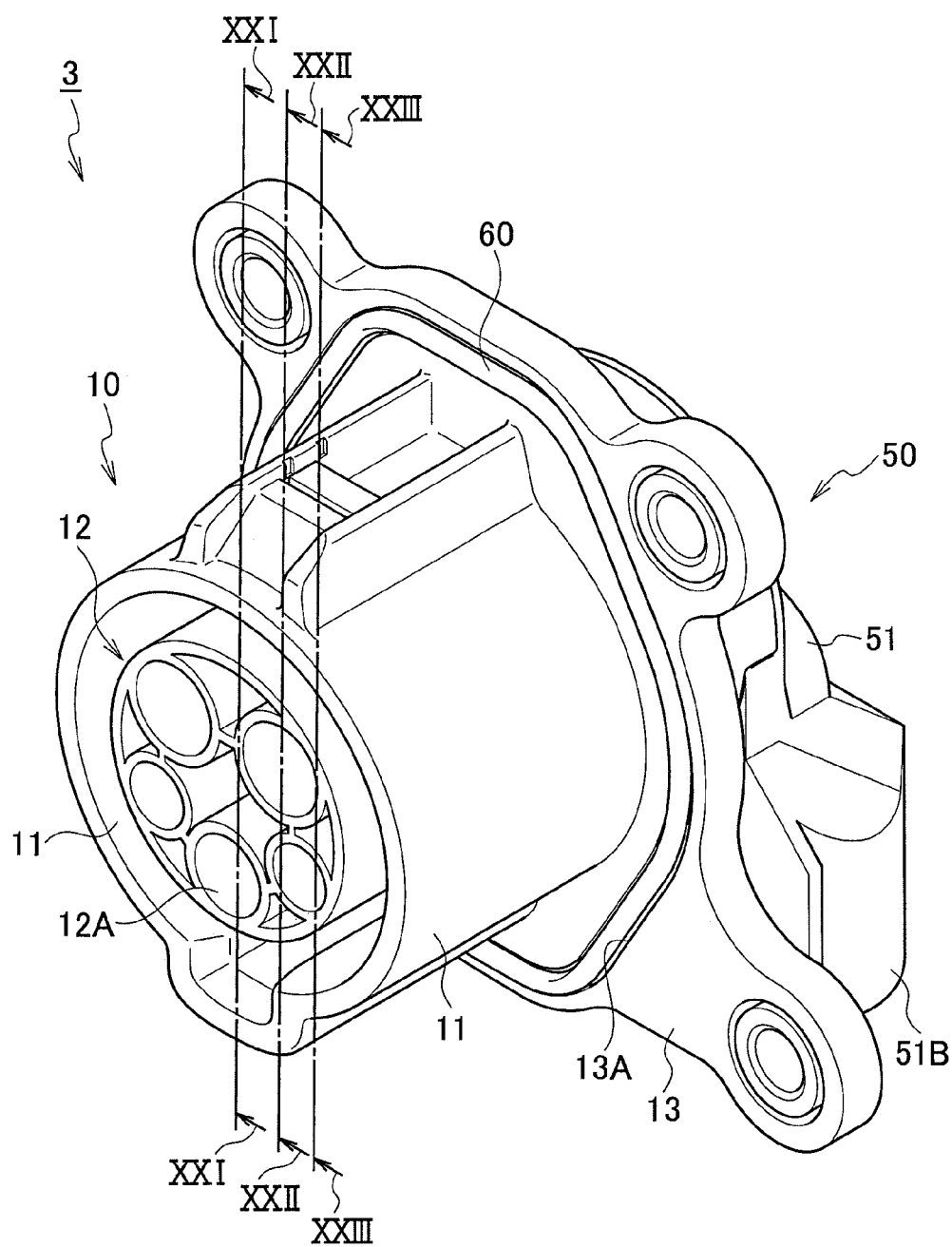
FIG. 18 is a front assembly perspective view of a charging inlet device according to a third embodiment.
Figure 19:
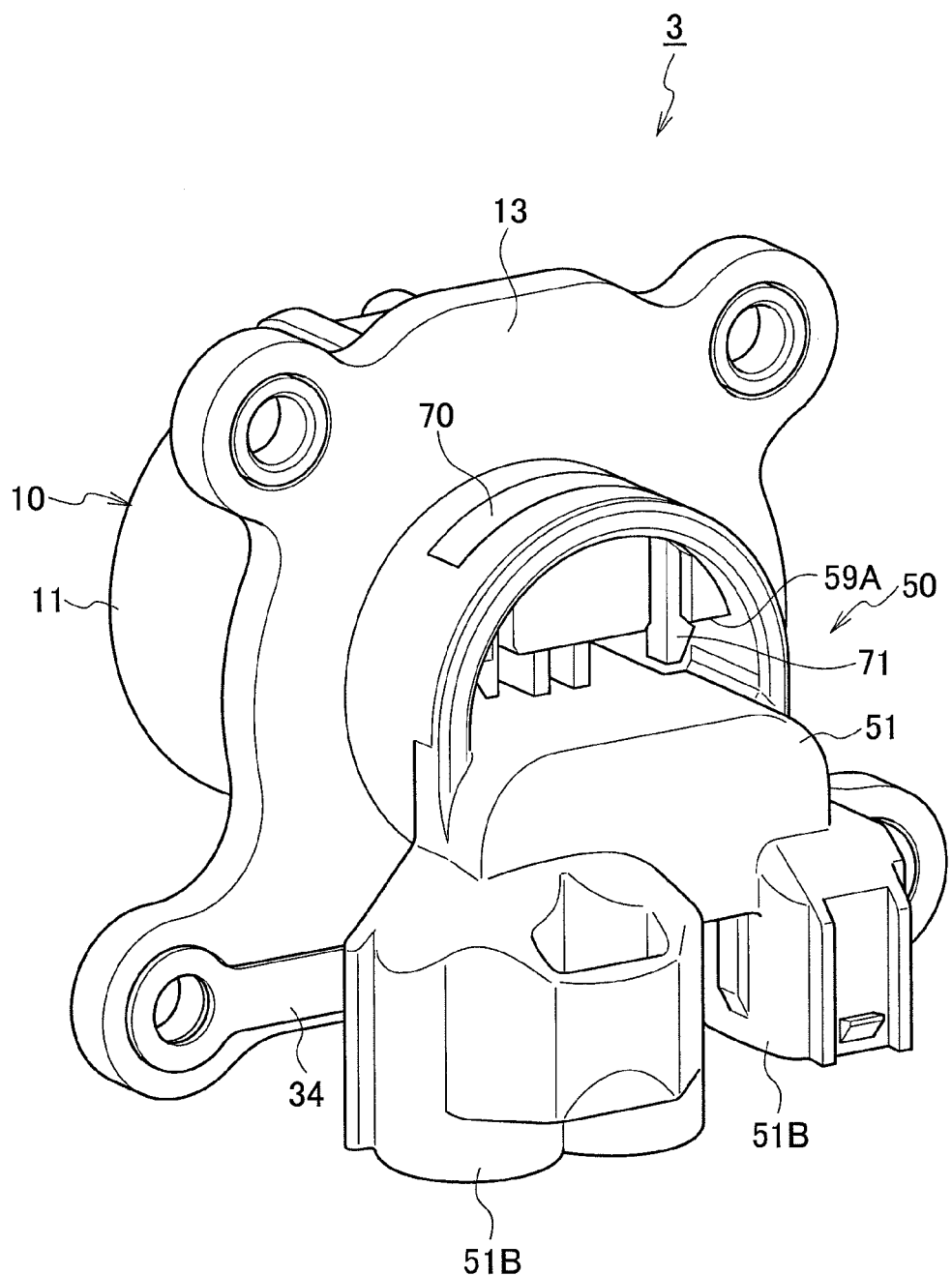
FIG. 19 is a rear assembly perspective view of the charging inlet device according to the third embodiment.
Figure 20:
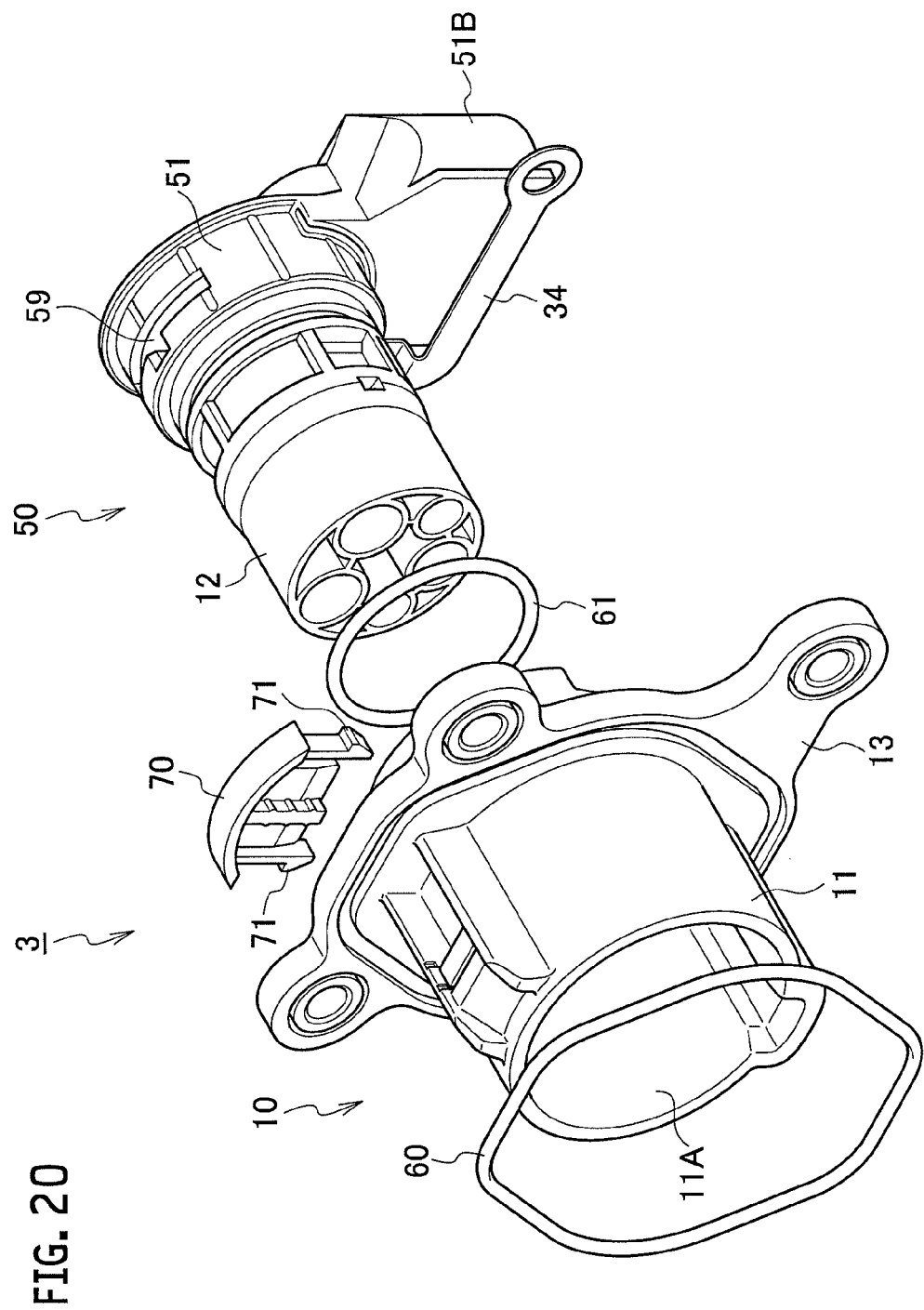
FIG. 20 is an exploded perspective view illustrating the charging inlet device according to the third embodiment.
Figure 21:
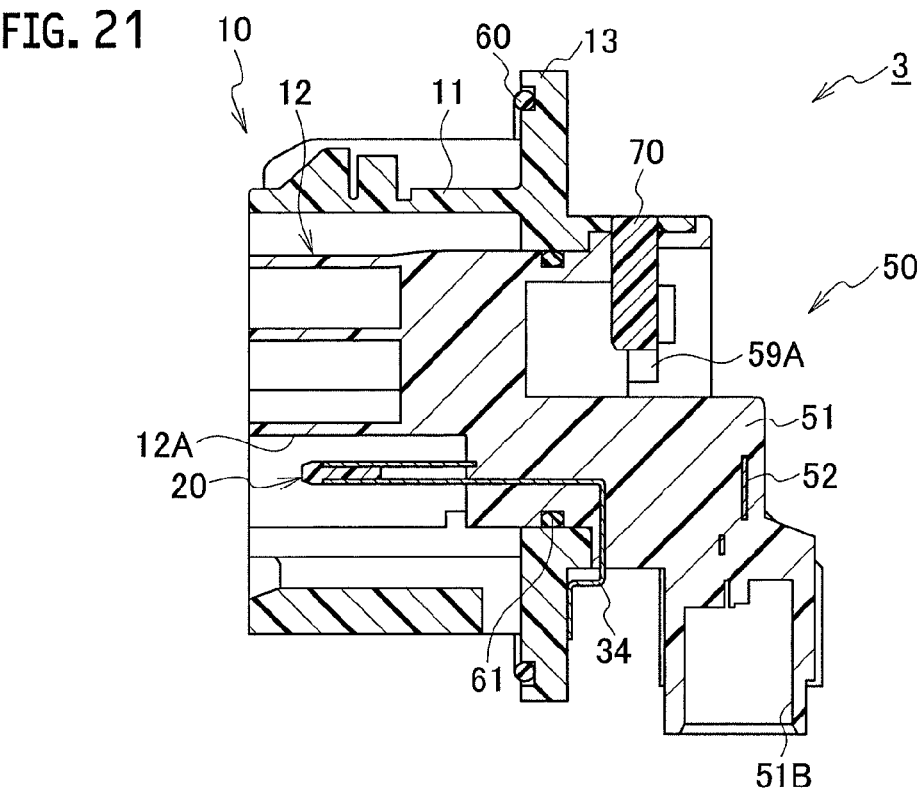
FIG. 21 is a XXI-XXI cross-sectional view of FIG. 18.
Figure 22:
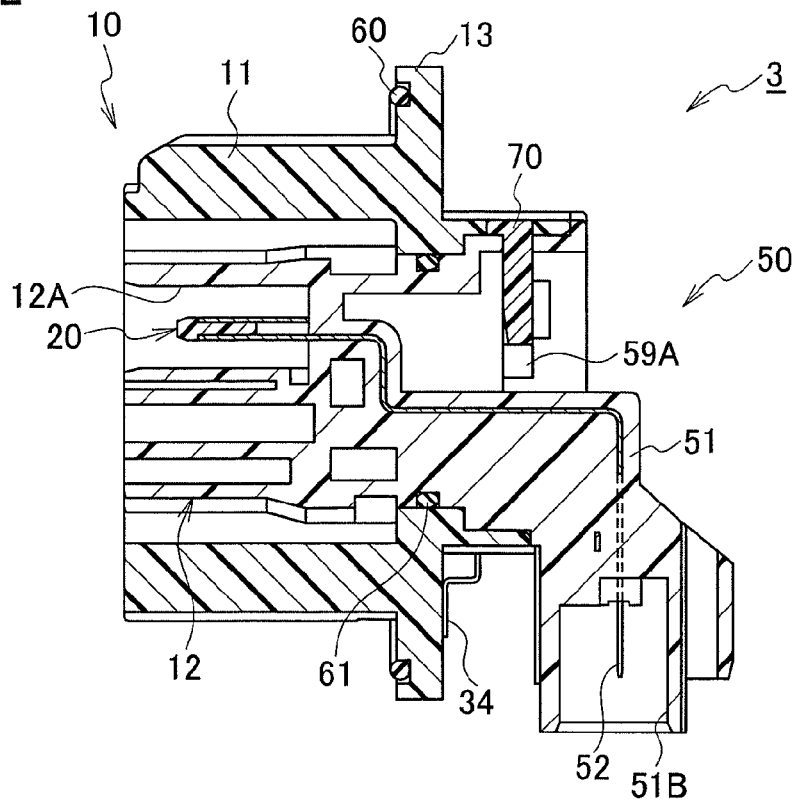
FIG. 22 is a XXII-XXII cross-sectional view of FIG. 18.
Figure 23:
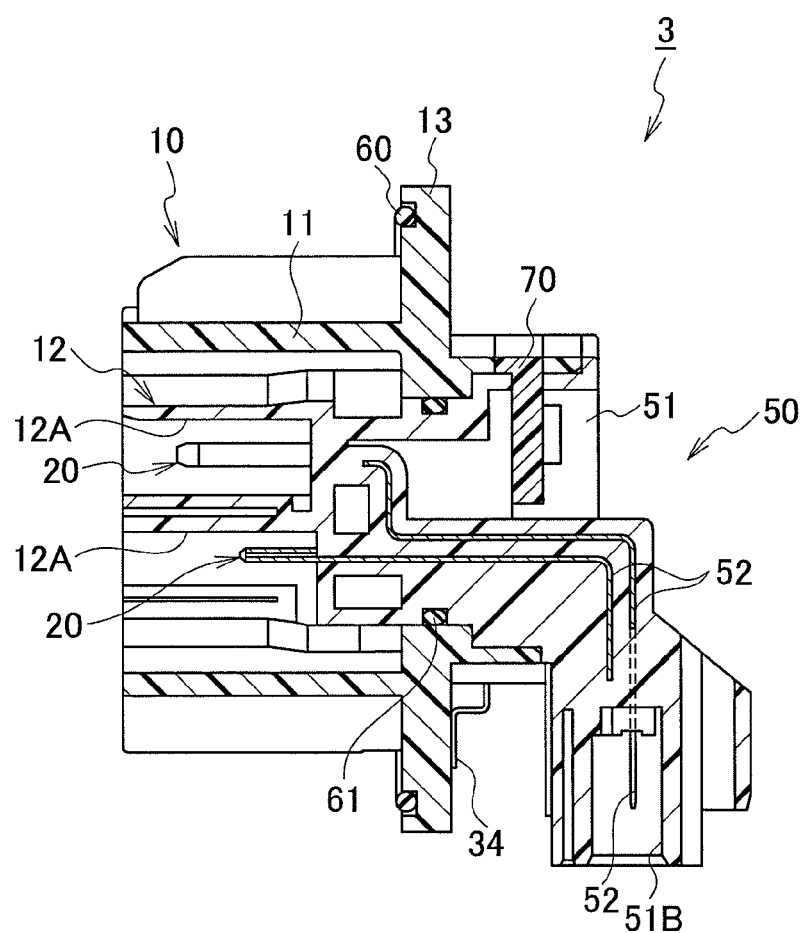
FIG. 23 is a XXIII-XXIII cross-sectional view of FIG. 18.

As shown in FIGS. 18 to 20, the rear connector 50 has a connector housing 12 in which the terminals 20 are arranged. That is, the rear connector 50 and the connector housing 12 are formed integrally. As shown in FIG. 20, the upper side of the rear connector 50 is provided with a lock insertion portion 59 into which a lock member 70 is inserted. The inside of the lock insertion portion 59 is provided with an engagement portion 59A engaged with an engaging claw 71 of the lock member 70 (see FIGS. 19, 21, and 22). Insertion of the lock member 70 into the lock insertion portion 59 engages the engaging claw 71 of the lock member 70 with the engagement portion 59A of the lock insertion portion 59, thereby fixing the rear connector 50 to the inlet housing 10.

In the third embodiment described above, like in the first and second embodiments, the exit direction of the electrical wire W can be set freely and the electrical wire W could be easily routed without being sharply bent if the width WP of the inside space of the inlet mounting hole P1 of the vehicle body panel P is narrow.

In the third embodiment, the rear connector includes the connector housing 12, and the terminal 20 is formed integrally with junction terminals 40 and is fixed to the rear connector 50. This reduces the number of terminal connection points and improves connection reliability.

Other Embodiments

While the present invention has been described above with reference to the embodiments, it should be understood that discussion and drawings which are incorporated herein are not intended to limit the invention. Various alternative embodiments, examples, and operational techniques will be apparent to those skilled in the art from the description above. For example, the embodiments of the present invention may be modified as follows. Specifically, while it has been described in the first to third embodiments that the electrical wire W is pulled downward from the rear connector 50, the pulling direction of the electrical wire W is not limited thereto and the electrical wire W may be pulled upward or laterally from the rear connector 50.

In this way, the present invention includes various embodiments not described above. Therefore, the scope of the present invention is determined only by the invention identification matters according to claims reasonable from the foregoing description.

The entire content of Japanese Patent Application No. 2012-227102 (filing date: Oct. 12, 2012) is incorporated herein by reference.

The invention claimed is:

1. A charging inlet device comprising:
an inlet housing fixed to a vehicle body panel with a charging port open towards an outer side of a vehicle body;
a terminal arranged in the charging port; and
a rear connector mounted to the inlet housing on an opposite side from the charging port and having a wire lead-out terminal connecting the terminal and an electrical wire routed through the vehicle body, wherein
the wire lead-out terminal is fixed to the rear connector, the wire lead-out terminal comprises:
a first portion extending in an extension direction of the terminal and connected to the terminal, and
a second portion extending in a direction different from the extension direction and connected to the wire, and
the rear connector is a separate member from the terminal.

2. The charging inlet device according to claim 1, wherein the first portion of the wire lead-out terminal extends towards the charging port, and
the second portion of the wire lead-out terminal extends in a direction orthogonal to the first portion of the wire lead-out terminal.

3. The charging inlet device according to claim 1, wherein the wire lead-out terminal is connectable to a removable connector of the electrical wire.

4. A charging inlet device comprising:
an inlet housing fixed to a vehicle body panel with a charging port open towards an outer sider of a vehicle body;
a terminal arranged in the charging port;
a rear connector mounted to the inlet housing on an opposite side from the charging port and having a wire lead-out terminal connecting the terminal and electrical wire routed through the vehicle body and;
an inner housing interposed between the inlet housing and the rear connector and securing the terminal, wherein
the inlet housing includes
an inlet body defining the charging port and
a connector housing in which the terminal is arranged.

5. A charging inlet device comprising:
an inlet housing fixed to a vehicle body panel with a charging port open towards an outer side of a vehicle body;
a terminal arranged in the charging port; and
a rear connector mounted to the inlet housing on an opposite side from the charging port and having a wire lead-out terminal connecting the terminal and an electrical wire routed through the vehicle body, wherein
the wire lead-out terminal is fixed to the rear connector, the wire lead-out terminal comprises:
a first portion extending in an extension direction of the terminal and connected to the terminal, and
a second portion extending in a direction different from the extension direction and connected to the wire, and
the rear connector is a separate member from the inlet housing.

6. The charging inlet device according to claim 5, wherein the inlet housing includes
an inlet body defining the charging port and
a connector housing in which the terminal is arranged, and
the terminal is formed integrally with the wire lead-out terminal and is fixed to the rear connector.

7. The charging inlet device according to claim 5, wherein the rear connector includes a connector housing in which the terminal is arranged, and
the terminal is formed integrally with the wire lead-out terminal and is fixed to the rear connector.

* * * * *